United States Patent

Skauli

[11] 4,008,064
[45] Feb. 15, 1977

[54] METHOD OF PAN GRANULATION
[75] Inventor: Öyvind Skauli, Porsgrunn, Norway
[73] Assignee: Norsk Hydro A.S., Oslo, Norway
[22] Filed: Feb. 12, 1975
[21] Appl. No.: 549,428
[30] Foreign Application Priority Data
  July 26, 1974 Norway .............................. 742729
[52] U.S. Cl. ........................................ 71/28; 71/35; 71/59; 71/63; 71/64 DA; 23/313 P; 425/222
[51] Int. Cl.² .................................................. C05C 13/00
[58] Field of Search ................ 71/64 D, 64 DA, 27, 71/28, 59, 63, 35; 23/313 P; 425/222

[56] References Cited
UNITED STATES PATENTS

| 2,436,766 | 2/1948  | Davis ............................ 71/64 DA |
| 2,860,598 | 11/1958 | Loesche ........................ 71/64 DA |
| 3,408,169 | 10/1968 | Thompson et al. ............. 71/64 DA |

Primary Examiner—Charles N. Hart
Assistant Examiner—Ferris H. Lander
Attorney, Agent, or Firm—Wenderoth, Lind & Ponack

[57] ABSTRACT

The invention provides an improved pan granulation process for the production of low-water or substantially anhydrous nitrogenous compounds. Hot nitrogenous melt and cooled particulate solids are fed to a rotating pan to form a cresent-shaped bed of rolling or tumbling particles, the thickness or depth of the bed increasing in the direction towards the periphery of the pan and its overflow sector, i.e. position 2 o'clock to position 6 o'clock when the pan surface is regarded as a clock face and the rotation of the pan is counter-clockwise. The cooled solid particles are fed to the pan at a point where the depth of existing material is small, desirably substantially zero, preferably in position 7 to 8 o'clock, if need be by feeding the particles through a tube or the like which extends into the tumbling material on the pan to the proximity of the surface of the pan itself. Subsequently, the cooled particles will then be covered by and with warmer particles tumbling over them. Further, the temperature of the product material as discharged from the pan is controlled to and maintained at about 4° to 25° C below the melting point of the material, and the main part of the melt is sprayed on to the surface of the bed within a zone in the quadrant 12 to 3 o'clock where the coarser particles appear, whereby the highest temperature of the bed will be restricted to a surface layer within this zone.

6 Claims, 6 Drawing Figures

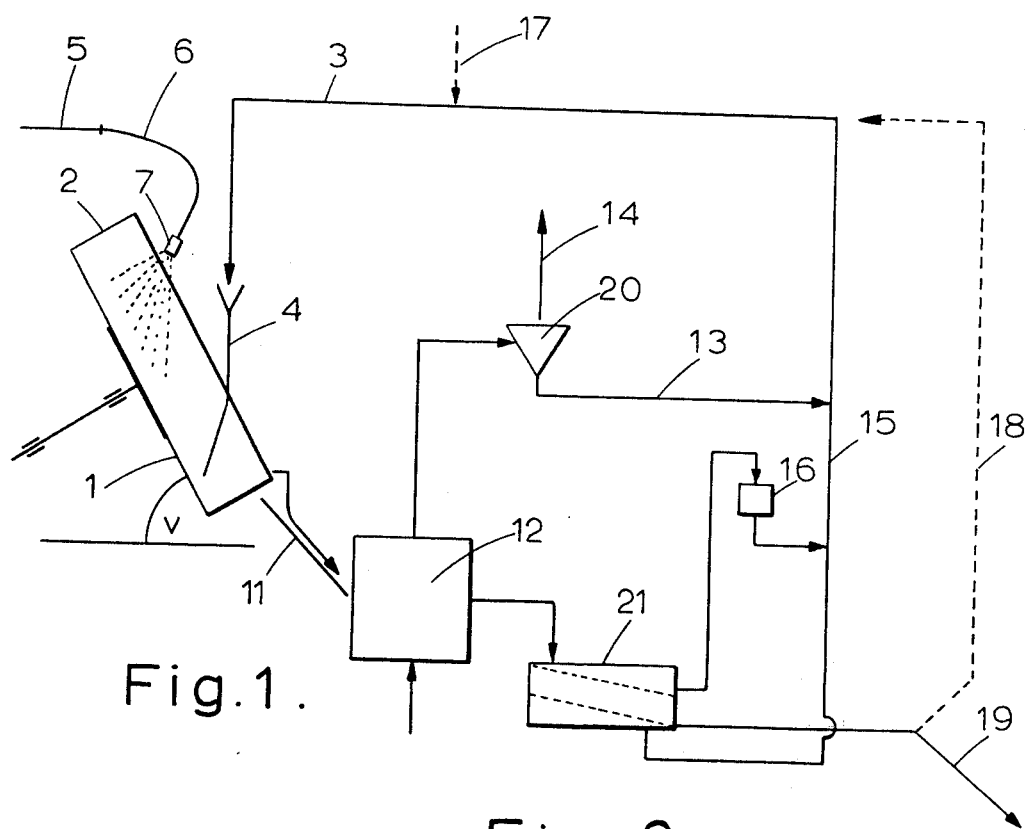
Fig.1.
Fig.2.
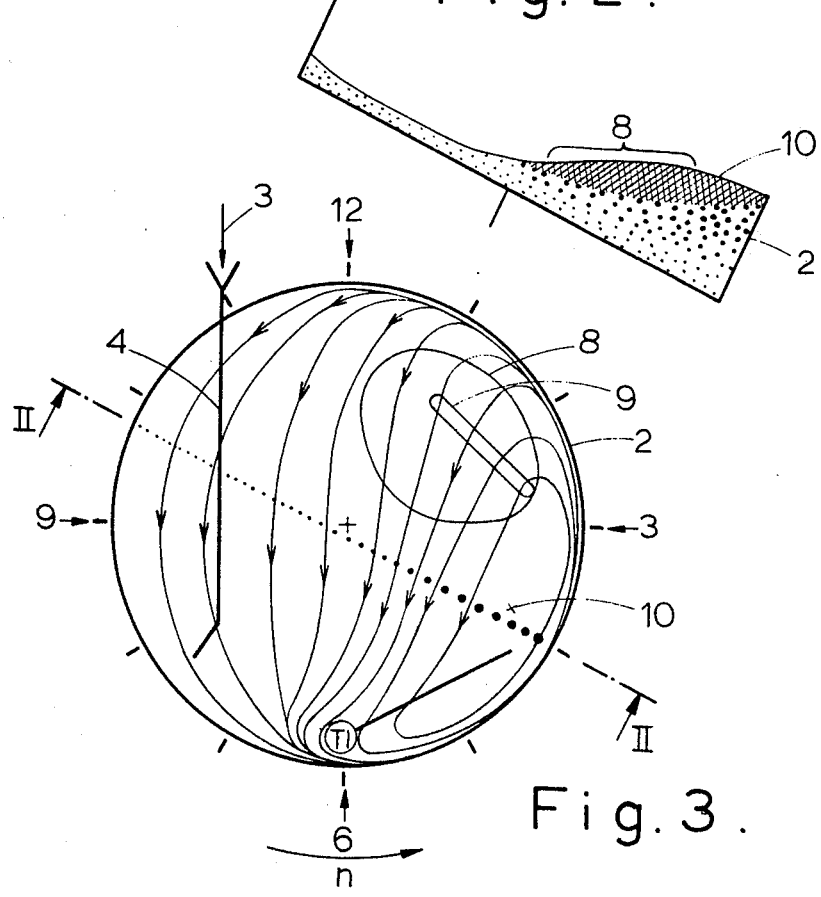
Fig.3.

METHOD OF PAN GRANULATION

BACKGROUND OF THE INVENTION

This invention relates to pan granulation of low-water or substantially anhydrous nitrogenous products from pure or mixed melts of compounds selected from the group consisting of urea, ammoniumnitrate and -phosphate, with or without other compounds added. These products are primarily utilised as fertilizers, and it is essential that they are available in the form of strong and storable granules with good spreadability.

During pan granulation the granules are gradually built up by spraying or spreading a liquid phase against a rolling bed of material on a circular, rotating and inclined pan onto which is charged comparatively finely divided solids as coolant. The effect of using a pan implies also that the product, i.e. the granules on the pan, are classified according to size. As the particles increase in size, they will gradually move upward in the bed and outward in the direction of the periphery of the pan in such a way that when the granules have attained the adequate size they will roll over the pan edge on that part of the pan where the particles are being lifted by the rotation of the pan. Smaller particles will be held back on the pan and grow till they become large enough to roll over the pan edge. By running the pan correctly, the particles which leave the pan will be of fairly uniform size. The particle size is mainly a function of the pan's rate of rotation and angle of inclination.

The amount of material of the rolling bed is not uniformly distributed over the pan area. The largest amount of material is on the upward moving part where the particles roll over the pan edge. Here, in the opposite direction of the lifting movement of the pan, a continuous sliding action takes place. The material depth decreases the direction of the diametrically opposite edge.

Pan granulation techniques were orginally developed for the conversion of dry pulverant and finely divided material, during the addition of moisture, usually water, to larger spherical granules or pellets, the granules are predominately formed by cementing together — or agglomeration of individual particles.

Granulation by agglomeration is a satisfactory techniques when using free flowing pulverant material, for instance for production of pellets for metallurgical purposes, dressing of minerals, ores, etc. with water or other low viscosity liquid binders. Pan granulation of substantially anhydrous melts, for instance fertilizers, has formerly been tried, but with poor results. By such processes it is desireable to produce fairly small particles, and it is important with regard to mixability, segregation, spreadability etc. that the particles are strong and of approximately uniform size.

By using the above mentioned melts of fertilizers it has so far been impossible to maintain satisfactory classification simultaneously with high growrate and dense particle structure.

The mobility of the individual particles will be decreased if the circulating mass of solids is heavily moistened by warm melt. This reduces the classification and sorting mechanism by the fact that free slides are obstructed and pulsating currents will occur, which leads to uncontrolled growth and overflowing of not completed particles over the rim of the pan. Simultaneously there will be a reagglomeration of too sticky, single particles forming large, warm aggregates which get too hot and disintegrate to a warm, sticky, crystalline mass. Accordingly the material will accumulate on the pan and the process breaks down. In order to avoid such problems and obtain a satisfactory granulation of such melts, the agglomeration techniques have been dropped and one has turned to granulation at low temperatures and applying other special conditions to secure a fast and complete solidification of the melt sprayed on the single particles. Strong spherical granules, built up of concentric layers of solidified melt, are obtained by using this technique.

U.S. Pat. No. 3,117,020 describes a method of pan granulation of substantially anhydrous solutions of urea and ammonium nitrate, where the solution has a predetermined water content of 5–8 weight percent. The granulation is carried out under conditions resulting in evaporation of water as the solution is being sprayed on the moving particles of the bed, which thereby are kept at a sufficiently low temperature to insure that the added layer solidifies immediately. The upper concentration limit of the solution is 95 weight percent and it is mentioned in this patent that a lower water content than 5 weight percent gives such a reduction in heat removal that the rolling particles of the bed are converted to a sticky mass impossible to handle.

U.S. Pat. No. 3,408,169 described a method of pan granulation of melts of urea and ammonium nitrate. According to this patent anhydrous urea or ammonium nitrate melt is sprayed onto a specially formed zone of fast moving cooled particles. This zone is positioned substantially diametrically opposite to a thicker bed of a crescent shape comprising slower moving, rolling particles on the discharging part of the pan. In this zone there is a relatively thin, densely packed layer of small particles mixed with cooled solids charged on the pan. The small particles follow the pan during its rotation while the cooled solids are charged onto the outmost upper part of the pan and mix with the warmer small particles just before the hot melt is sprayed on the pan. Hereby occurs a rapid cooling and solidification of the melt, whereby uncontrolled agglomeration is avoided. Dense granules are built up having an onion-like structure and consisting of several concentric layers of solidified melt.

In spite of the fact that the problems in pan granulation of substantially anhydrous and ahydrous nitrogenous products have been solved, these known methods using layering techniques for making granules, constituting layers of solidified melt, have not made a breakthrough industrially compared to rotary drum granulation and prilling. This is primarily due to too low an output of the pan by such low-temperature techniques where solidification of the melt in layers dominates the particle growth and where net pan output of 500–800 kg/m$^2$h is considered very high.

The literature gives by example the production capacity of a pan for granulating urea, ammoniumnitrate and ammoniumnitrate/-calciumcarbonate to be 15, 6 and 8 ton/m$^2$ day, respectively, and this is considered to be the natural upper production limit for one unit.

SUMMARY OF THE INVENTION

The primary object of the present invention is to provide a new and improved method for pan granulation of substantially anhydrous nitrogenous products intended for fertilizing purposes and with an appreciably higher specific output and production capacity than have earlier been achieved, and where there is made use of specially high temperatures in the bed of particles it being simultaneously, possible to regulate and control the growth and the size of the particles.

A further object of the invention is to provide a simple and reliable method of pan granulation of the above mentioned melts where charging of solids and melt is conducted in such a way and by use of such conditions that there is maintained a high-temperature zone in the surface of the bed in that region of the pan where the largest particles are concentrated, whereby there are formed finished granulated particles, having a dense structure and high strength.

These objects are achieved by providing a pan granulation process for the production of low-water or substantially anhydrous nitrogenous compounds, including charging hot nitrogenous melt and cooled solids to a pan, whereby during the rotation of the pan there is formed a substantially crescent shaped bed of rolling particles having a thickness of depth which granually increases in the direction towards the periphery of the pan and its overflowing sector, i.e. from a position of approximately 2 o'clock to a position of approximately 6 o'clock where the pan surface is regarded as a clock face and the rotation of the pan is counter clockwise. The solid material is charged to the pan bottom surface in such a manner that downward sliding particles cover the charged cooler material. The temperature of the discharged material from the pan is kept within a range of 4°– 25° C below the melting point of the material. The main part of the melt is sprayed onto the surface of the bed in a zone within the quadrant from 12 to 3 o'clock where the coarser particles appear, whereby the highest temperature arising in the rolling material bed is concentrated within this zone.

BRIEF DESCRIPTION OF THE DRAWINGS

Other important embodiments and benefits of the invention will become apparent from the following description and the accompanying drawings where:

FIG. 1 is a schematic view of the granulation pan with the charging means and succeeding units for carrying out the present invention.

FIG. 2 is a vertical sectional view taken approximately along the 4 o'clock to 10 o'clock dotted line in FIG. 3 through the pan and illustrates especially how the bed is built up and how the classification of particles on the pan take place.

FIG. 3 is a perspective view of the pan schematically illustrating the respective paths of movement of the particles.

DETAILED DESCRIPTION OF THE INVENTION

Figure 4:
FIG. 4 is a sectional view of a urea particle made according to the present invention.

It has been found that it is possible to carry out the controlled agglomerating process of the invention where the temperature in the bed, measured in the discharging stream of material, is within an interval of 4°– 25° C below the melting point of the material. In multicomponent systems without a defined melting point, the temperatures in question are those at which substantial parts of the material would appear in melted phase. Having started the process, the temperature in the bed is the most important process parameter, and it is necessary to keep it within narrow limits. Surprisingly, sufficient particle strength has been achieved at temperatures up to close to the melting point of the material, without the particles being crushed or loosing their mobility. The growth rate increases under these conditions and the product attained has a homogenous and mechanically strong structure.

The controlled agglomeration can be carried out in an apparatus schematically illustrated in FIG. 1. In the description the same reference numbers are used in all the drawings to designate the same elements. FIGS. 2 and 3 schematically illustrate how the material during the process is distributed quantitatively on the pan. The pan in FIG. 3 is shown in the form of a clock face in order to designate the relative positions. Positions are marked according to the hourly numbers 1–12. The pan's rotation is intended to be counter clockwise. It is to be understood however, that the rotation of the pan could be clockwise, with the result that the below mentioned hourly positions would be accordingly changed. E.g., a 3 o'clock position with counter clockwise rotation would be a 9 o'clock position with clockwise rotation.

The pan 1 is equipped with a rim 2 whose height can be varied. The pan's angle of inclination to the horizontal plane, angle $v$ in FIG. 1, and the rate of rotation $n$, can also be varied. The rate of rotation should be variable from 50–80% of critical rate of rotation which depends upon the dimensions in question.

Solids from line 3 flow by means of a pipe 4 close to the bottom surface of the pan and preferably far down on the pan. The stream of melt from line 5 is conducted via a flexible reinforced hose 6 to a nozzle 7 which gives more or less fine dispersion of melt on the solids. The flexible mounting allows for the application of one or several nozzles in desired positions and angles relative to the plane of the pan since the method presupposes concentration of the main part of the hot melt, such that an especially warm growth zone is formed on the surface of the bed in that part of the pan where the coarser particles are moving. In FIGS. 2 and 3 are indicated the area 8 whereto the main part of the melt is charged. The zone 9 indicates what may be termed a maximum concentrated melt catchment area where most of the melt supplied from nozzle 7 hit the pan.

In FIG. 3 are indicated the paths of movement the particles will be following on the surface. FIG. 2 illustrates that the warm zone which is shown by the shaded area, where the particles agglomerate rapidly and are rounded off, has a limited extension. Good particle movement is attained within this warm zone where only small amounts of fines are present. It will be understood that if the section represented by FIG. 2 were taken at for instance 2 o'clock – 8 o'clock, or 3 o'clock – 9 o'clock instead of 4 o'clock – 10 o'clock, in FIG. 3, the picture in FIG. 2 would be much the same since the main area of agglomeration on the pan will normally be between 1 o'clock and 5 o'clock.

The free flow of particles causes an accurate classification such that growing product particles, at temperatures of 4°–25° C below the melting point of the material, move in paths increasingly further to the right. The particles finally move outside the growth zone and will fall over the pan rim, possibly after having made several cycles around the paths' center of rotation 10. The temperature is measured by a temperature sensor TI on FIG. 3 in the area where completed particles flow over the pan rim, and this sensor is situated just below the surface and in the direction of the movement of the particles.

The shaded area on FIG. 2 illustrates the limited extension of the warm zone in a plane vertical to the pan. Some granulation of the finest grain takes place in the transition zones, bordering the warm zone. However, the main part of the solid fines are only moderately heated and thereby their ability to flow freely is retained. This is necessary in order to obtain the classification that transports growing particles into the warmer zone on the top (as shaded in FIG. 2) and sorts them out towards the surface. Stable operating temperatures are attained relatively fast. A condition is soon established in which preheating, agglomeration, smoothing, sorting and discharging will balance, and where the output is increased to unusually high levels. If the temperature gets too high, slides and good classification are obstructed. Carrying out the operation at too low temperatures produces less dense and less smooth particles.

Operating at the high temperatures of 4°–25° C below the melting point of the material, as illustrated in the following examples, produces finished particles which by leaving over the rim of the pan show signs of being moistened throughout by not yet solidified melt. Surface cooling, however, gives them sufficient strength to flow undamaged via a chute 11 to a product cooler 12, which can be of the known fluidized bed, drum or shaft type. The process comprises also known features of granulating plants, such as removal of dust from the heated air 14 from product cooler 12, by means of a filter 20, screening of the product by means of a screen 21 and recirculation of dust and screened fines to the pan by lines 13 and 15, optionally partly via a crusher 16. The heat balance of the pan can in some cases be obtained by addition of some other material than that returned from the air filter 20 and screen 21, for instance solid coolant through conduit 17.

Generally, the thermal control of the process will be attained by returning cooled product by means of conduit 18. Such recirculation has earlier been a decisive disadvantage because it limits the pan's net production capacity. In the method according to the present invention this is of far less concern due to the pan's high outputs per unit area, cp. the examples.

In NPK-production, for instance, addition of potassium salt will supply a great part of the solid coolant needed. Application of part of the melt-compound as solid coolant has also been tried with success. As shown in the examples below the high screening output can be taken full advantage of by renouncing from any forced return of the granulated product as coolant. Satisfactory heat balance can be attained by freely choosing the amounts of a compound which are to be charged as melt and as solid coolant. The screened product can be discharged from the apparatus through line 19 without having to return any of it to the granulating process.

FIG. 4 represents a sectional view of a urea particle according to the present invention. The cut sectioned area was coloured to obtain improved contrast in the photograph.

Figure 5:
FIG. 5 shows part of a surface of fracture of an ammonium nitrate particle made according to the invention.

FIG. 5 illustrates a view of a non-coloured section through an ammonium nitrate particle also made according to the invention. As clearly seen from the pictures, the particles have a dense and homogenous internal structure, surrounded by a fairly uniform and smooth outer shell. The particle appears to be moistened throughout by melted phase and has been exposed to such high temperatures that the boundary between agglomerated particles is erased and typically solidified layers or strata do not exist in the inner structure.

Figure 6:
FIG. 6 shows a sectional view of an urea particle made according to the above described known solidifying techniques.

In contrast to this, FIG. 6 illustrates a cut sectional area through a urea particle made according to the known solidifying or layering techniques. Here too the cut was coloured to improve photographic contrast.

It is evident from the picture that this particle has a structure which consists of concentric layers developed by repeated cooling and solidification of melt.

The following examples represent the preferred ways of carrying out the process according to the invention.

EXAMPLE 1.

Ammoniumnitrate with a grain size of 1.5 – 4.5 mm.
The production was carried out on a pan having a diameter of 3.5 m and the height of the rim was 0.7 m. A $NH_4NO_3$-melt, evaporated to a water content of 0.5%, was charged to the pan through a solid cone nozzle and at a temperature of 178° C in an amount of 10,300 kg/h. The crystallization temperature of the $NH_4NO_3$-melt was measured to 163° C. The nozzle was operated at a low static feed pressure (1 kg/cm$^2$).

The longest axis in the approximately elliptical spraying area for a melt, was ca. 1.3 meter and the main part of the melt hit the surface of the solids within the quadrant from 12 to 3 o'clock. The rate of rotation was 11.6 rpm and the angle of inclination was 57.5°. 2700 kg/h of finely grained $NH_4NO_3$ was used as solids. The total amount of $NH_4NO_3$ was 13,000 kg/h and that was evidently a low load on the pan, 30 – 40% of the pan area was not used. The solids were charged to the bottom of a pan in the position from 7–8 o'clock. The temperature of the product stream measured was 140° C. The operation was stable and 77% of the product had a grain size of 1.5 – 4.5 mm. Screened material was added and dissolved in unevaporated $NH_4NO_3$ from the manufacturing stage.

Net output attained at this low pan-load was thus 1030 kg/h m$^2$ and could easily be increased to at least twice this amount. The low load was not due to the pan design but to limited capacity of other parts of the production line.

EXAMPLE 2.

Ammonium nitrate 4–11 mm.
$NH_4NO_3$-melt as in example 1 in an amount of 13,500 kg per hour was charged to the pan via a flat jet nozzle with low feeding pressure. The total sprayed area was in the quadrant from 12 – 3 o'clock. The pan rim was 0.8 meter. The solids used were of microprill-quality at 22° C and all particles had a size of less than 1 mm. 4,400 kg per hour was charged and stable operation was attained and the temperature of the product was 147° C. The particle growth was very rapid at this temperature. The angle of inclination was 52.5° and part of the pan bottom surface was not covered at its upper left hand side, which indicates that the output could have been higher. The rate of rotation was ca 8 rpm. 96% of the product was within the desired size of 4 – 11 mm, such that net production was 1780 kg/hm$^2$.

Production of a coarse product has also been tried using a wider spreading nozzle. Temperatures up to 152° C were applicable. It was essential under these conditions to position the sprayed area such that the warm zone did not get a too large extention. If that happened, the slide angle became too high, hot material recirculated and was mixed with the finer material, classification and overflow were reduced and the process broke down.

EXAMPLE 3

Urea 1 – 4.5 mm.

Two streams were charged to a pan of 0.9 m diameter and with a rim of 0.26 m:

Urea melt at 136° C: 1650 kg per hour. Nozzle pressure was 4.6 ato. One solid cone nozzle was used.

Urea solids at 28° C: 1310 kg per hour.

The solids consisted solely of a crushed cooled product stream having 4–8% of a grain size less than 1.5 mm. The solids were charged far down on the pan. Product temperature of discharged material was 128° C. The paths of movement were stable and the classification all over the pan was indeed good. Accordingly there was no indication that this was the maximum output. The product had narrow size limits. 88.7% was within the desired limits of 1.5 – 4.5 mm and 73% was within 2 – 4 mm. Tamped liter weight of the 1.5 – 4 mm fraction was 748 gram per liter and the mechanical strength of the particles was high. Net production in this case was 2480 kg/hm². Stable operation was attained at a bed temperature of 129°– 130° C.

Periodically was applied a quality of solids having 50% below 1.5 mm. This gave stable operation at 127°–128° C, but the positioning of the nozzle was more critical. The fine material could easily get too warm and sticky, which resulted in break down.

With even finer solids the temperature had to be reduced to 125° C and the product was less dense and neat.

EXAMPLE 4

Manufacture of NPK-fertilizer with KCl as the potassium compound.

On a pan of 0.75 m diameter and with a rim of 0.255 m, 840 kg NPK per hour was produced. 90% of this material was within the limits of 3–5 mm. About 320 kg per hour of a substantially anhydrous ammonium phosphate-ammoniumnitrate melt with a N/P-ratio of ca 4 and a temperature of 170° C was charged to the pan through a nozzle with a spraying area 15 cm wide transversely to the direction of movement of the sliding coarse particles, on the upward moving side of the pan.

The stream of solids which was directed towards the pan bottom comprised the following compounds. 242 kg KCl and 54 kg kieseritt at 70° C, 76 kg of crushed NPK recycled material at 30° C and 148 kg of the NP-compound in the unmelted state at 25° C, all taken per hour, and with a water content below 0.5%. In the NPK-product having this composition small amounts of melted phase will occur from ca 124° C, while substantial amounts of melted phase first will be present at ca 130° C.

Suitable upper granulating temperatures applicable in the described method were 115°– 125° C. The granules formed were neat and of uniform size.

Restrictions in the feeding part of the plant used excluded experiments with higher net outputs than 1720 kg/hm² which was obtained here. The high screening output shows that the pan's production capacity is larger.

EXAMPLE 5

Manufacture of NPK-fertilizer having $K_2SO_4$ as its potassium compound.

In a NPK-production similar to the one described in example 4, KCl was replaced by $K_2SO_4$. In NPK-products having this composition, small amounts of melted phase will occur from ca 140° C while substantial amounts of melted phase first will be present at ca 145° C. Suitable granulating temperatures in this case were 130°–137° C.

None of the production experiments in example 1 – 5 has shown any sign that output limits were reached, not even when using a 0.9 meter diameter pan and a material throughput of up to 4.65 ton/hm².

The unexpected high outputs which can be obtained from a pan operated according to this new method will be of importance in the establishment of simple granulation units having large production capacities.

A net production of 25–30 tons per hour is accordingly within reach when pans having diameters of 4 m are used.

I claim:

1. In a pan granulation process for the production of low-water or substantially anhydrous nitrogenous compounds, comprising charging hot nitrogenous melt and cooled solids to an inclined rotating pan whereby, during the rotation of the pan there is formed a substantially crescent shaped bed of rolling particles having a thickness or depth which gradually increases in the direction towards the periphery of the pan and its overflowing sector, i.e. from position 2 o'clock to position 6 o'clock where the pan surface is regarded as a clock face and when the rotation of the pan is counter clockwise, or from position 6 o'clock to position 10 o'clock when the rotation of the pan is clockwise, the improvement comprising:

charging the solid material to the pan bottom surface such that downward sliding particles cover the thus charged cooler solid material;

maintaining the temperature of discharged material from the pan within a range of 4°– 25° C below the melting point of the material; and spraying the main part of the melt onto the surface of the bed in a zone within a quadrant from position 12 to position 3 o'clock when the rotation of the pan is counter clockwise or from position 9 o'clock to position 12 o'clock when the rotation of the pan is clockwise and where the coarser particles appear, whereby the highest temperature arising in the rolling material bed is concentrated within said zone.

2. In a pan granulation process according to claim 1, further comprising charging said solid material to said pan in a position from 7 – 8 o'clock thereon when the rotation of the pan is counter clockwise, and a position from 4 – 5 o'clock thereon when the rotation of the pan is clockwise.

3. In a pan granulation process according to claim 1, especially intended for granulation of ammonium nitrate, further comrising maintaining the temperature of the discharged material stream at 140°– 150° C, within from 11°–23° C below the melting point of ammonium nitrate.

4. In a pan granulation process according to claim 1, especially intended for granulation of urea, further comprising maintaining the temperature of the discharged material stream at 124°–129° C, within from 4°– 9°C below the melting point of urea.

5. In a pan granulation process according to claim 1, especially intended for granulation of NPK-fertilizer with KCl as the potassium compound, further comprising maintaining the temperature of the discharged material stream at 115°–125° C, within from 5 – 15° C below the melting point of the NPK-system.

6. In a pan granulation process according to claim 1, especially intended for granulation of NPK-fertilizer with $K_2SO_4$ as the potassium compound, further comprising maintaining the temperature of the discharged material stream at 130°–137° C, within from 8°– 15° C below the melting point of the NPK-system.

* * * * *